US008635365B2

(12) United States Patent
Todd (10) Patent No.: US 8,635,365 B2
(45) Date of Patent: Jan. 21, 2014

(54) DATA PROCESSING SYSTEM USING MATCHING ENGINE AND ROUTING SWITCH

(75) Inventor: Stephen James Todd, Hants (GB)

(73) Assignee: International Business Machines Corporation, Armonk, NY (US)

( * ) Notice: Subject to any disclaimer, the term of this patent is extended or adjusted under 35 U.S.C. 154(b) by 1195 days.

(21) Appl. No.: 11/747,943

(22) Filed: May 14, 2007

(65) Prior Publication Data

US 2008/0052727 A1 Feb. 28, 2008

(30) Foreign Application Priority Data

Aug. 22, 2006 (GB) .................................. 0616613.6

(51) Int. Cl.
*G06F 15/16* (2006.01)
(52) U.S. Cl.
USPC .......................................... 709/238; 709/228
(58) Field of Classification Search
USPC ................................................. 709/228, 238
See application file for complete search history.

(56) References Cited

U.S. PATENT DOCUMENTS

| 7,243,130 | B2 * | 7/2007 | Horvitz et al. ................. 709/207 |
| 7,296,061 | B2 * | 11/2007 | Martinez et al. .............. 709/211 |
| 7,349,980 | B1 * | 3/2008 | Darugar et al. ................ 709/238 |
| 7,383,253 | B1 * | 6/2008 | Tsimelzon et al. ............ 707/610 |
| 7,389,325 | B2 * | 6/2008 | Roberts .......................... 709/206 |
| 7,417,959 | B2 * | 8/2008 | Dorner et al. ................. 370/260 |
| 7,444,433 | B2 * | 10/2008 | Goldstein et al. ............. 709/253 |
| 7,461,062 | B2 * | 12/2008 | Stewart et al. ..................... 707/6 |
| 7,530,077 | B2 * | 5/2009 | Bhogal et al. ................. 719/318 |
| 2003/0050648 | A1 * | 3/2003 | Alferness et al. ............. 606/108 |
| 2003/0208537 | A1 * | 11/2003 | Lane et al. ..................... 709/204 |
| 2005/0071427 | A1 * | 3/2005 | Dorner et al. ................. 709/204 |
| 2005/0091435 | A1 * | 4/2005 | Han et al. ...................... 710/310 |
| 2006/0149811 | A1 * | 7/2006 | Bennett et al. ................ 709/203 |
| 2006/0155581 | A1 * | 7/2006 | Eisenberger et al. ............ 705/3 |

* cited by examiner

*Primary Examiner* — Tauqir Hussain
*Assistant Examiner* — Ebrahim Golabbakhsh
(74) *Attorney, Agent, or Firm* — Jordan IP Law, LLC (57) ABSTRACT

A data processing system comprises a matching engine for matching messages and a switch for routing data. The data processing system is arranged to receive publish messages comprising topic and source identification, and to receive subscribe messages comprising topic and sink identification. The matching engine is arranged to match one or more sink identifications to a source identification according to a matching topic and the switch is arranged to receive control signals dependent on the result of the matching and accordingly to route data from a source to one or more sinks. The system can include a switch control, the switch control arranged to receive an output of the matching from the matching engine and to transmit the control signals to the switch, the control signals defining the routing to be applied by the switch.

10 Claims, 6 Drawing Sheets

DATA PROCESSING SYSTEM USING MATCHING ENGINE AND ROUTING SWITCH

FIELD OF THE INVENTION

This invention relates to a data processing system that comprises a matching engine and a switch for routing data, and to a method of operating such a system. The system supports the publish/subscribe control of data streams.

BACKGROUND

Publish/subscribe (pub/sub) is an asynchronous messaging paradigm. In a typical pub/sub system, publishers post messages to a broker and subscribers register subscriptions with that broker. In a topic-based system, messages are published on particular "topics" which are used by the broker to identify matching subscribers. Subscribers in a topic-based system may receive all messages published on the topics to which they subscribe and all subscribers to a topic may receive the same messages (subject to filtering and assuming the subscriptions are active). Pub/sub is a very valuable paradigm, but not easily applied to streams of data, especially where the streams are already using an alternative predefined standard protocol.

Currently each pub/sub message is routed according to properties of the message itself (typically a topic name as mentioned above, but sometimes the content of the message). As each message arrives, the broker analyzes the message and determines the correct set of subscribers, and a second step distributes the message accordingly. This system is asynchronous, and does not easily support interfacing with other data communication protocols.

SUMMARY

According to a first aspect of the present invention, there is provided a data processing system comprising a matching engine for matching messages and a switch for routing data. The data processing system is arranged to receive first messages comprising source identification, and to receive second messages comprising sink identification. The matching engine is arranged to match one or more sink identifications to a source identification, and the switch arranged to receive control signals dependent on the result of the matching and accordingly to route data from a source to one or more sinks.

According to a second aspect of the present invention, there is provided a method of operating a data processing system comprising a matching engine for matching messages and a switch for routing data. The method comprises receiving first messages comprising source identification, receiving second messages comprising sink identification, matching, at the matching engine, one or more sink identifications to a source identification, receiving, at the switch, control signals dependent on the result of the matching, and accordingly routing data from a source to one or more sinks.

According to another embodiment of the present invention, a computer program product that controls the routing of data includes a computer readable storage medium having computer usable program code embodied therewith. The computer readable storage medium may include computer usable program code configured to receive at least one first message comprising source identification and to receive at least one second message comprising sink identification. The computer readable storage medium may also include computer usable program code configured to match at least one sink identification to a source identification. In addition, the computer readable storage medium can include computer usable program code configured to generate a control signal dependent on a result of the matching to control a switch to route data from at least one source to at least one sink.

In the system of this invention, the two steps of matching (routing mediation) and the actual routing are separated. The first and second messages are control messages, and do not contain the data that is to be routed to the identified sinks. The data stream that is routed by the switch does not need to contain any control information equivalent to routing information. The data stream for which a routing mediation is required may implement formats and protocols (for example, some streaming audio format) that cannot accommodate extra information. When the first and second messages arrive at the matching engine, the matching is performed to identify the correct set of subscribers. This set is not applied directly to the first and second messages, but is used to 'wire' the flow of the associated data stream. Subsequent messages (data packets) arriving on that stream are delivered to the appropriate set of subscribers.

Owing to the invention, it is possible to provide a system that will route data synchronously, without any requirement in relation to the structure of the data, but that nevertheless supports a very straightforward method of controlling the data routing, by using a matching engine. The two above-referenced components of the system, the matching engine and the routing switch, could be existing components that are reused with a novel interface, or could be specific components designed from scratch. The processing of the mediation and routing is more efficient, as the complex matching decisions can be made at subscription time (when messages are received specifying topic and sink identification), rather than when data packets/streams are received. The system can work in standard streams that do not explicitly contain switching data (such as voice over IP streams).

Advantageously, the first messages comprise publish messages comprising topic and source identification, and the second messages comprise subscribe messages comprising topic and sink identification, and the matching engine is arranged to match one or more sink identifications to a source identification according to a matching topic. By using a pub/sub mediation, the routing decisions can be executed in a system that is flexible and efficient, and supports simple matching of sources to sinks.

The streams of data that are to be routed may be, for example, audio streams that require dynamic real-time routing (for example, in a conference call system that identifies different audio streams for different talkers, and allows dynamic control (such as by the talker, listener and moderator) of who hears who. In addition, the system also applies where routing is to be applied to message streams set up as point to point communications from the application point of view, which utilizes the power of pub/sub to set up routing mediations. The system allows the use of the power of existing pub/sub systems (such as topics, wild-card matching, topic based security, etc.) as an out-of-band control mechanism for other streams of data.

Preferably, the system further comprises a switch control, the switch control arranged to receive an output of the matching from the matching engine and to transmit the control signals to the switch, the control signals defining the routing to be applied by the switch. A logic circuit configured as a switch control can be used to interface between the two components, the pub/sub matching engine and the routing switch, which then supports the piggybacking of the system onto conventional components.

The switch control can be arranged to receive the publish messages and the subscribe messages and to transmit further messages to the matching engine, in order for the matching engine to execute the matching of one or more sink identifications to a source identification according to a matching topic. In this way, a completely conventional pub/sub matching engine can be used, with the switch control arranged to receive messages that relate to the data routing and re-structure these messages in a manner that will be acceptable to the matching engine. The switch control then received back from the matching engine messages that are used to generate control messages that control the routing carried out by the switch.

Advantageously, the switch is arranged, following receipt of data from a determined source, to trigger the matching, by the matching engine, of one or more sink identifications to the determined source identification according to a matching topic. The operation of the data processing system can be such that no matching occurs until streamed data is received by the routing switch. This can be used to trigger the actual matching process. This ensures that the most up-to-date sources and sinks are matched together.

Ideally, the matching engine is arranged to maintain a mapping table storing the results of the matching of sink identifications to a source identification according to a matching topic. The matching engine is arranged to recalculate the mapping table, following receipt of either a publish message comprising topic and source identification, or a subscribe message comprising topic and sink identification.

BRIEF DESCRIPTION OF THE DRAWINGS

Embodiments of the present invention will now be described, by way of example only, with reference to the accompanying drawings, in which.

DETAILED DESCRIPTION

Figure 1:
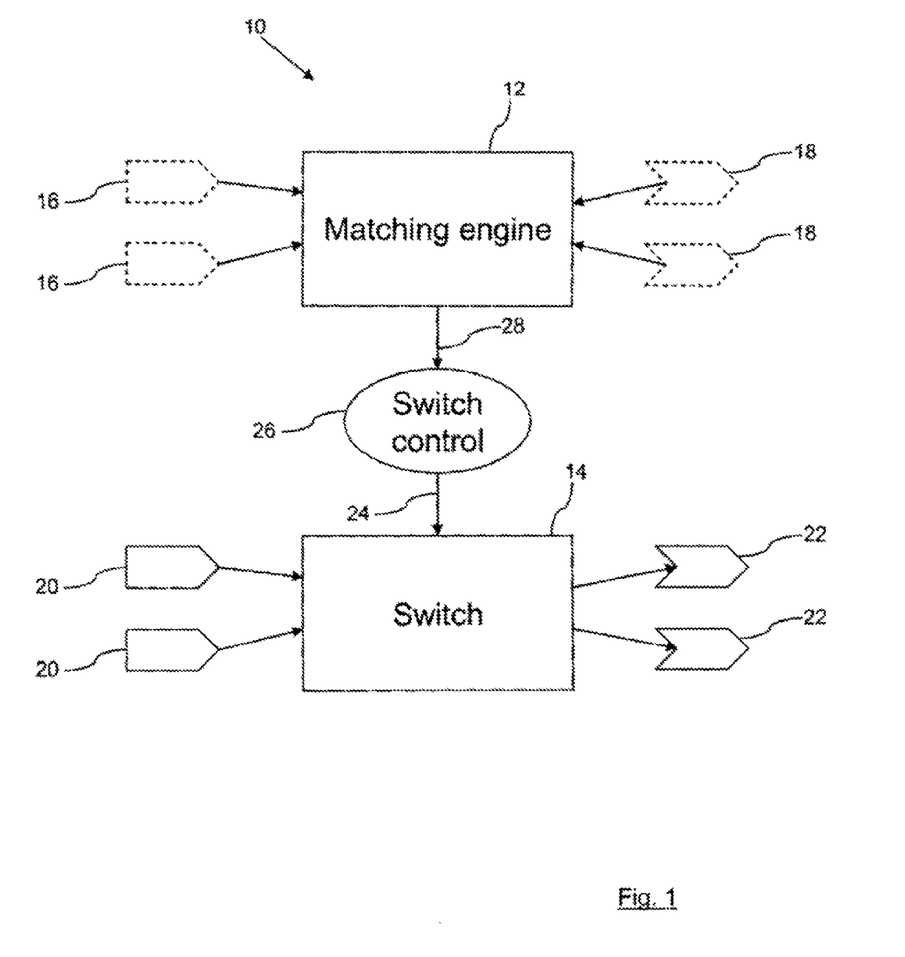
FIG. 1 is a schematic diagram of a data processing system.

FIG. 1 illustrates a first embodiment of the data processing system 10, which comprises a matching engine 12 for matching messages and a switch 14 for routing data. The data processing system 10 is arranged to receive first messages that are publish messages 16 which comprise topic and source identification (sourceId), and to receive second messages that are subscribe messages 18 which comprise topic and sink identification (sinkId). The sources 20 and sinks 22 are identified by the identifications in the proxy messages 16 and 18 received by the matching engine 12.

The matching engine 12 is arranged to match one or more of the sink identifications 22 to a source identification 20 according to a matching topic (contained in the various proxy messages) and the switch 14 is arranged to receive control signals 24 dependent on the result of the matching. The switch 14 is accordingly arranged to route data from a source 20 to one or more sinks 22. The system 10 in FIG. 1 also includes a switch control 26, the switch control 26 being arranged to receive an output 28 (of the matching) from the matching engine 12. The switch control 26 is arranged to transmit the control signals 24 to the switch 14, the control signals 24 defining the routing to be applied by the switch 14.

The sources and sinks can be considered to be pre-existing 'streams': source streams and sink streams. Each stream has an id. Each stream can be, for example, a sequence of messages or packets. Example streams are message queues and RTP audio codec streams. The standard pub/sub technology of publishers and consumers is utilized in the operation of FIG. 1. For simplicity of description there is assumed to be a single separate broker (matching engine). The principles of the invention still apply for the cases where some/all of the broker function is implemented at publisher/subscriber, or where there is a network of interoperating brokers.

Figure 2:
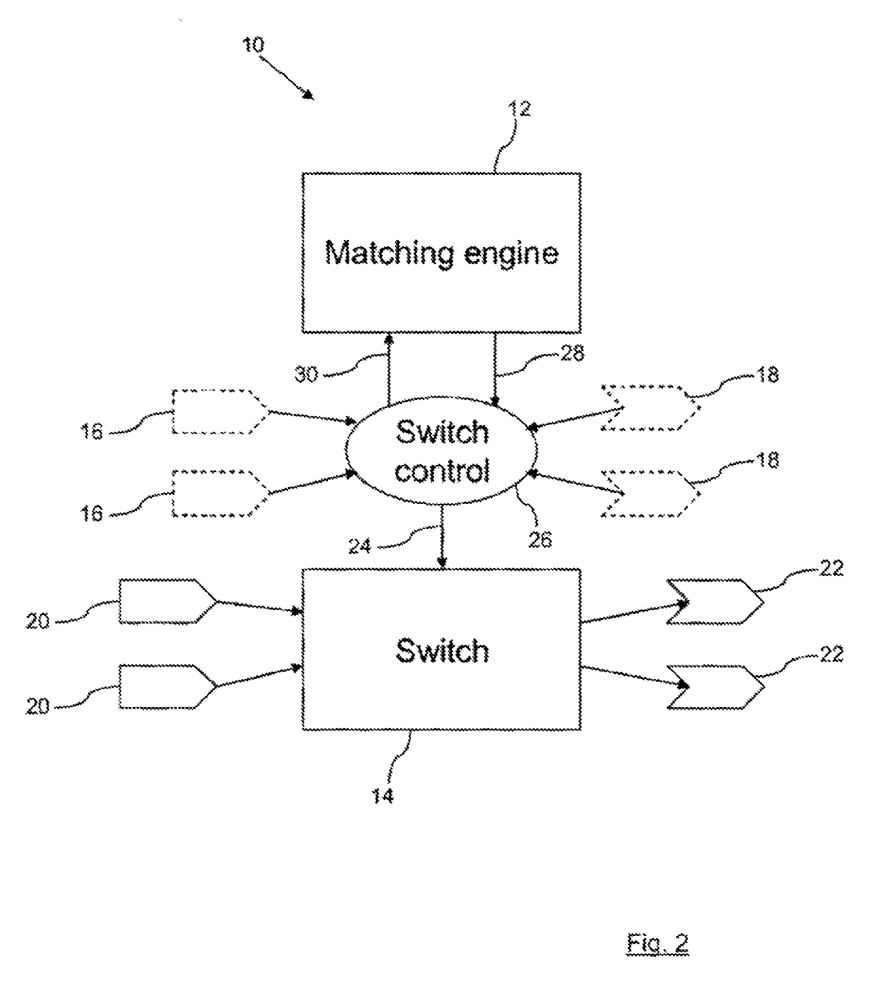
FIG. 2 is a schematic diagram of an embodiment of the data processing system.

FIG. 2 shows a second embodiment of the data processing system 10. In this embodiment, the switch control 26 is the component within the data processing system 10 that is arranged to receive the publish messages 16 and the subscribe messages 18. The switch control 26 is also arranged to transmit further messages 30 to the matching engine 12, in order for the matching engine 12 to execute the matching of one or more sink identifications to a source identification according to a matching topic (based upon the messages received by the switch control 26).

This embodiment of FIG. 2 supports the use of a pre-existing matching engine 12, which could be any suitable pub/sub broker. The switch control 26 is responsible for interfacing with the matching engine 12 and for structuring the messages 30 that the switch control 26 sends to the matching engine 12, to enable the overall system 10 to take advantage of the existence and functionality of the engine 12, without any adaptation of that broker 12. The switch control 26 receives back an output 28 from the matching engine 12, which the switch control 26 then processes to produce control signals 24 which are used to control the routing by the switch 14.

Figure 3:
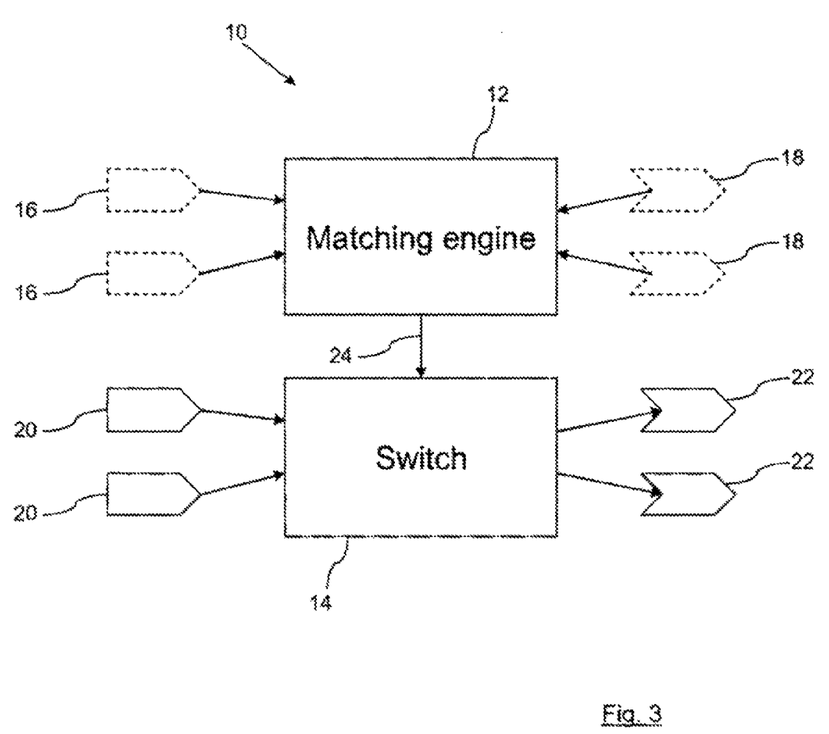
FIG. 3 is a schematic diagram of another embodiment of the data processing system.

FIG. 3 shows a third embodiment of the system 10. In this embodiment there is no specific "switch control" component. The matching engine 12 matches messages and the switch 14 routes data. The matching engine 12 is arranged to receive the publish messages 16 which comprise topic and source identification, and to receive the subscribe messages 18 comprising topic and sink identification.

When the matching engine 12 has matched one or more of the sink identifications 22 to a source identification 20 according to a matching topic (contained in the various proxy messages) the switch 14 receives control signals 24 dependent on the result of the matching, directly from the matching engine. The switch 14 is accordingly arranged to route data from a source 20 to one or more sinks 22. The matching engine 12 of FIG. 3 can be used in conjunction with a conventional switch 14.

In effect, the existence and format of the switch control 26 may vary according to the particular embodiment of the invention. Listed below are some specific examples, to summarize the specific embodiments detailed above.

An embodiment combining existing systems is shown in FIG. 2. In this scenario, both the matching engine 12 and the switch 14 are existing applications i.e. currently known technology (possibly with associated special hardware in the case of the switch 14). The embodiment of the invention would bring these known components together with minimum (or no) change to either. In this case, there is likely to be a big difference between the interface and protocol details of the two systems, and the switch control 26 may need extensive logic.

For example, the matching engine 12 may well only be available as an internal part of a publish/subscribe broker system. In this case, the switch control 26 may need to access the matching engine 12 by making appropriate publications and subscriptions to the publish/subscribe system. When the switch control 26 receives publications from the broker 12, then the switch control 26 will interpret them and take the appropriate actions to control the switch 14.

A new integrated system is shown in FIG. 3. The integrated system may include a matching engine 12 and switch 14 that are co-designed to implement this invention. These will fit together much more naturally. The switch control may amount to no more than a defined interface between the two parts, for example an API, or a simple on/off bit array set by the matching engine 12 and used by the switch 14.

A preferred embodiment as shown in FIG. 1 may represent an intermediate solution. A system component may be modified to make it more naturally control the switch 14. For example, the matching engine 12 from a pub/sub system may be exposed to permit direct use by the switch control 26 without the need for intermediate pub/sub messaging.

Figure 4:
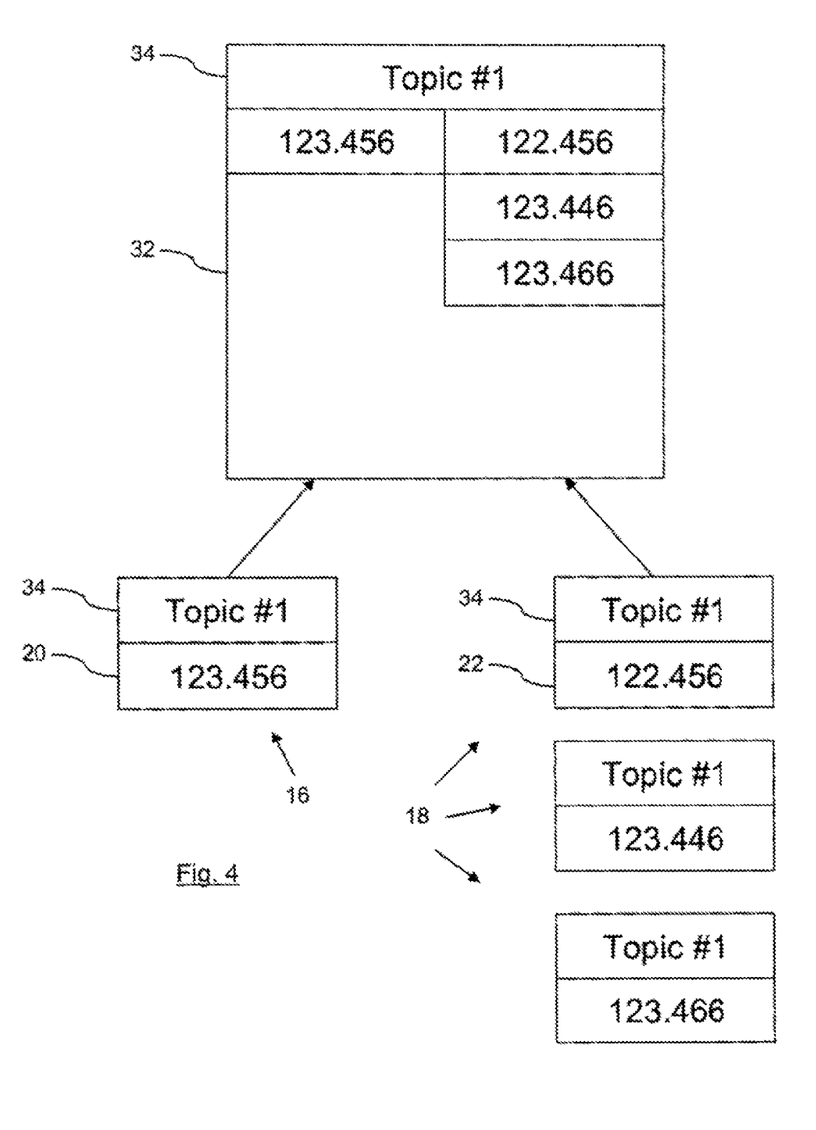
FIG. 4 is a schematic diagram of messages and a mapping table.

A simple way for the matching engine 12 to execute the matching of sinks and sources is for the matching engine 12 to maintain a mapping table storing the results of the matching of sink identifications to a source identification according to a matching topic. FIG. 4 shows an example of such as mapping table 32. The table 32 shown in FIG. 4 is shown in a fairly simple form with a single topic and a small number of sources and sinks, for illustrative purposes.

The matching engine 12 has received a single publish message 16, which includes the topic 14 "Topic #1" and the source identification 20, which is shown as a network address "123.456". The matching engine has also received three subscribe messages 18, which each consist of topic 34 and sink identification 22. When the matching engine 12 executes the matching, then the mapping table 32 is generated, which is based around the topic 34. All of the publish messages 16 and subscribe messages 18 are processed into a group of identifications, which define addresses of the sources and sinks.

Depending upon the exact embodiment of the invention used (as per FIGS. 1 to 3), control signals 24 will be generated that are used to control routing by the switch 14. For example, in the system of FIG. 3, then the matching engine 12 can generate control signals 123.456→122.456, 123.456→123.446 and 123.456→123.466, which define the routing to be carried out by the switch 14. Depending upon the structure of the system 10, this routing can be single or bi-directional. Once the switch 14 receives the control signals 24, then routing of data streams (such as audio or video) can begin.

The matching engine can be configured to recalculate the mapping table 32, following receipt of either a publish message 16 comprising topic and source identification, or a subscribe message 18 comprising topic and sink identification. This supports a constant updating of the mapping information stored in the mapping table 32, and ensures that the routing carried out by the switch 14 is up-to-date and dynamic.

One method of implementing the invention is to augment the normal pub/sub concept with 'proxy publish' and 'proxy subscribe'. Proxy publish associates a source with a topic; proxy subscribe associates a sink with a topic. In general, the associations may be many/many. After a proxy publish message, the system 10 behaves as if packets from the source have been published on the topic. After the proxy subscribe, matching packets are sent to the sink. At any one time there are two sets of such current associations: {sourceId/topic} and {topic/sinkId}.

The proxy publish may be exposed as new verbs, for example:
Proxy Publish pp=session.createProxyPublisher(Topic topic, SourceId source); //start the association of sourceId/topic
// ... no pp.publish( ), but packets that arrive on sourceId in this interval are effectively 'published' on topic.
pp.close( ); //end the association
and a similar set of verbs for proxy subscribe.

Alternatively, the proxy publish may be exposed by 'abuse' of existing verbs and infrastructure—this is a simpler change to an existing system. There is no difference in the essential principles.

special topics: messages on these topics are used to start/stop associations (e.g. topic $proxyStartPublish$/<sourceId>/<realTopic>)

special headers: messages arriving on a topic with provider specific headers proxyStartPublish, proxyStopPubiish are used to start/stop associations When a data packet arrives from a source 20 at the switch 14, the logical switch decision is to identify the source, find all topics currently associated with the source, for each of these topics, find all matching sinks fusing standard matching engine logic) and to forward the message to all such sinks. In effect, the switch 14 is arranged, following receipt of data from a determined source, to trigger the matching, by the matching engine 12, of one or more sink identifications to the determined source identification according to a matching topic.

In practice, it is advantageous for the matching engine 12 to pre-compute the mapping from sourceId to {set of sinkIds}. In this way of doing the matching, no matching is needed on the arrival of each packet. The mapping must be pre-computed each time there is a proxy publish or a proxy subscribe. In more complex pub/sub systems, for example, where there are security controls that change the pub/sub rules, re-computation is also needed for other changes that affect the pub/sub rules. This re-computation may need a complete re-computation of the mapping, or generally may be much more incremental.

Where the data streams being routed are real-time (for example RTP (Real-Time Transport Protocol) audio codec streams) the pub/sub control computation preferably operates on a separate thread from the switch. When the mapping is recomputed (for example on arrival of a proxy publish) the new mapping is recomputed on the separate thread, and then 'patched in' to the switch control as a single pointer update operation.

Different methods of operating the data routing system 10 are possible. For example, depending on the situations, it may be preferable to use traditional pub/sub style and hide the sourceId from the sinkId, or traditional peer-to-peer style and inform the sinkId of the sourceId.

The system 10 has numerous practical applications. For example, the system 10 can be used in routing mediation control. In this scenario, the data streams routed by the switch 14 are standard message queues, and viewed as queues by the producers and consumers. The routing mediations are needed dependent on available resources. The use of general pub/sub permits much more flexible routing control to allow for more variables. In this case it may be desirable that the switching is 'one of' rather than 'all of'.

A second scenario for using the system 10 relates to UDP (User Datagram Protocol) streams, for use in, for example, conference call. In traditional person-to-person VOIP (voice over IP), there is an RTP stream from speaker to listener, with therefore two such streams, one each way, for normal conversation. In a conference call, each potential speaker has an RTP stream from a VOIP source to the broker. This stream is identified by the source IP address and port.

In a typical call with the same stream going to all listeners, the broker decodes the incoming streams, adds them (possibly including extra logic), re-encodes them, and sends to each listener. The listeners are identified by their target IP address and port. The listener receives a single stream that looks exactly like a normal incoming stream in a one-to-one call.

Figure 5:
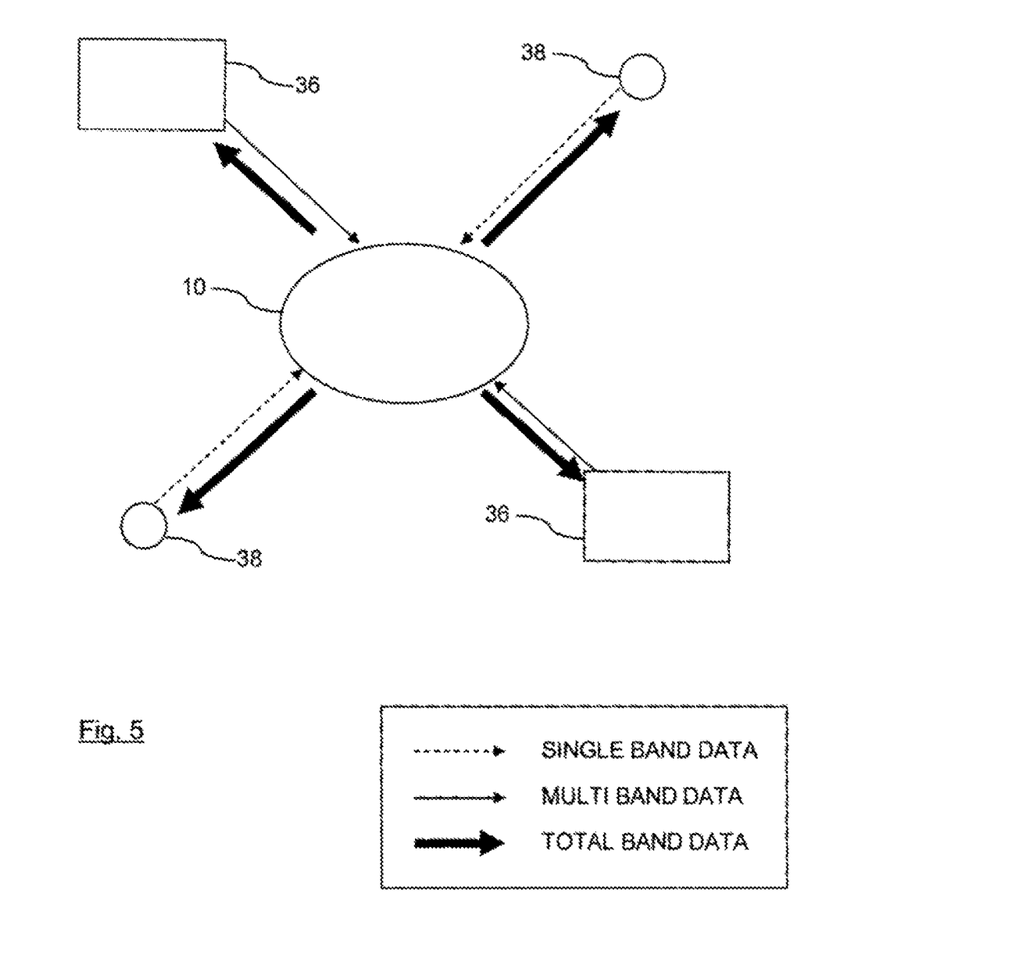
FIG. 5 is a schematic diagram of a VOIP session using the data processing system of any one of FIGS. 1 to 3.

The data processing system 10 can be used for a VOIP based conference call, as shown in FIG. 5. Multiple speaker phones 36 and standard telephones are connected via the system 10. The switch 14 in the system 10 will resend each incoming packet to all listeners. The listeners will thus receive a multiplexed set of streams; all with the same target IP address and port (those of the listener), but the stream for each packet can be distinguished by the source IP address and port.

The listener must demultiplex based on this, then in a more complex case, there will be control of who can talk to whom, and when. This control will be at the pub/sub level as described in this disclosure. It is quite likely the talkers and listeners will be in control of their own publish/subscribe rules, so there will be an associated 'obvious' relationship between the topics and streams. In this scenario it will almost certainly be necessary to inform the sinks of the sourceIds, so that the sinks can properly demultiplex and apply jitter control to streams arriving from different sources.

In a more complicated version of the system 10 crossover between 'real' and stream data can be supported. In the scenarios above, the pub/sub and stream data have been kept separate. There may be situations where system 10 will be configured to allow crossover between the two domains: either messages are published by a normal publish, but forwarded to an 'out of band' sink, or messages are sent by an 'out of band' source, but published in the normal pub/sub manner.

It will be appreciated that some of the features of the invention are available in existing systems; for example in conference call systems. However, the invention has several novel benefits. It provides greater power than existing systems in its matching features. By reuse of existing matching engine software, it can provide a more economically produced solution. Finally, by integrating stream-based and message-based systems (for example, telephone and computer systems), it is possible to provide a simpler overall solution by incorporating just a single piece of matching logic to be configured and maintained.

Figure 6:
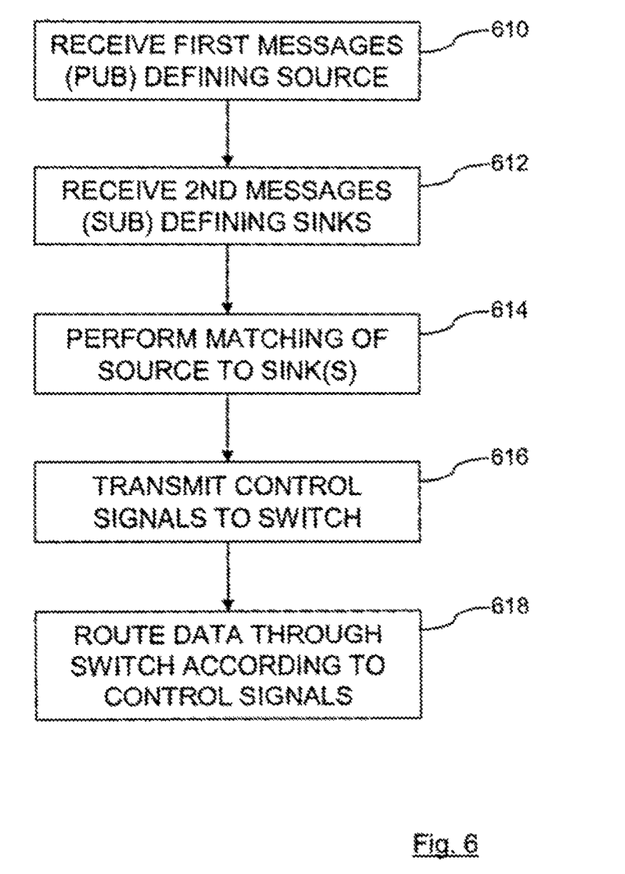
FIG. 6 is a flow diagram of a method of operating the data processing system.

FIG. 6 summarizes the operation of the system 10, which with the matching engine 12 and switch 14 achieve a separation of the messages that define the routing of data/data streams, and the actual routing of the data/data streams. The first step 610 is the receiving of first messages which comprise source identification. If the matching is carried out by a pub/sub matching engine, then the first message will also include a topic. Secondly, at step 612 second messages comprising sink identification are received. Again, if the matching is carried out by a pub/sub matching engine, then the second message will also include a topic.

The use of the terms "first" and "second" does not necessarily imply the order in which the messages are received. It will be common for a second message, which comprises the sink location to be received before a first message is received by the system. In fact, in a likely practical embodiment, the first and second messages will be received by the system continually without any reference to message order, with a smaller number of "first" messages detailing the sources being interspersed in a larger number of "second" messages, which detail the sinks.

Once the messages have been received, then at step 614 matching, at the matching engine, takes place which matches one or more sink identifications to a source identification. In a topic-based pub/sub architecture then the topic portion of the messages is used to carry out the matching by the matching engine.

Once the matching has been carried out, then control signals are transmitted (step 616) to the switch, the control signals being dependent on the result of the matching. The final step 618, which is earned out by the switch is the routing of the data from a source to one or more sinks.

What is claimed is:

1. A data processing system, comprising:
   a matching engine for matching messages and a switch for routing data, the data processing system arranged to receive first messages, independent of the data, the first messages comprising source identification, and to receive second messages, independent of the data, the second messages comprising sink identification that indicates a network address associated with the second messages, the matching engine arranged to match one or more sink identifications to a source identification utilizing the first messages and the second messages, and the switch arranged to receive control signals dependent on a result of the matching and accordingly to route the data from a source to one or more sinks, wherein the first messages comprise publish messages comprising topic and source identification, and the second messages comprise subscribe messages comprising topic and sink identification, and the matching engine arranged to match one or more sink identifications to a source identification according to a matching topic; and
   a switch control, the switch control arranged to receive an output of the matching from the matching engine and to transmit the control signals to the switch, the control signals defining the routing to be applied by the switch, wherein the switch control is further arranged to receive the publish messages and the subscribe messages and is arranged to transmit further messages to the matching engine, in order for the matching engine to execute the matching of one or more sink identifications to a source identification according to a matching topic, and wherein the switch is arranged, following receipt of the data from a determined source, to trigger the matching, by the matching engine, of one or more sink identifications to the determined source identification according to a matching topic.

2. The system according to claim 1, wherein the matching engine is arranged to maintain a mapping table storing the results of the matching of sink identifications to a source identification according to a matching topic.

3. The system according to claim 2, wherein the matching engine is arranged to recalculate the mapping table, following receipt of either a publish message comprising topic and source identification, or a subscribe message comprising topic and sink identification.

4. A computer implemented method of operating a data processing system comprising a matching engine for matching messages and a switch for routing data, said method comprising:
   receiving first messages, independent of the data, the first messages comprising source identification;

receiving second messages, independent of the data, the second messages comprising sink identification that indicates a network address associated with the second messages;

matching, at the matching engine, one or more sink identifications to a source identification utilizing the first messages and the second messages;

receiving, at the switch, control signals dependent on a result of the matching and accordingly routing the data from a source to one or more sinks, wherein the first messages comprise publish messages comprising topic and source identification, and the second messages comprise subscribe messages comprising topic and sink identification, and the matching comprising matching one or more sink identifications to a source identification according to a matching topic, the data processing system further comprising a switch control;

receiving an output of the matching from the matching engine at the switch control and transmitting the control signals to the switch, the control signals defining the routing to be applied by the switch, wherein the publish messages and the subscribe messages are received at the switch control;

transmitting further messages to the matching engine from the switch control, in order for the matching engine to execute the matching of one or more sink identifications to a source identification according to a matching topic; and following receipt of the data from a determined source at the switch, triggering the matching, by the matching engine, of one or more sink identifications to the determined source identification according to a matching topic.

5. The method according to claim 4, further comprising maintaining a mapping table storing the results of the matching of sink identifications to a source identification according to a matching topic.

6. The method according to claim 5, further comprising recalculating the mapping table, following receipt of either a publish message comprising topic and source identification, or a subscribe message comprising topic and sink identification.

7. A computer program product to control the routing of data, the computer program product comprising a non-transitory computer readable storage medium having computer usable program code embodied therewith, the computer readable storage medium comprising:

computer usable program code configured to receive at least one first message, independent of the data, the first message comprising source identification;

computer usable program code configured to receive at least one second message, independent of the data, the second message comprising sink identification that indicates a network address associated with the second message;

computer usable program code configured to match at least one sink identification to a source identification utilizing the first messages and the second messages; and computer usable program code configured to generate a control signal dependent on a result of the matching to control a switch to route the data from at least one source to at least one sink, wherein the first message comprises a publish message comprising topic and source identification, and the second message comprises a subscribe message comprising topic and sink identification, and the matching comprising matching one or more sink identifications to a source identification according to a matching topic, the data processing system further comprising a switch control;

computer usable program code configured to receive an output of the matching from a matching engine at the switch control and transmit the control signals to the switch, the control signals defining the routing to be applied by the switch, wherein the publish message and the subscribe message are received at the switch control;

computer usable program code configured to transmit further messages to the matching engine from the switch control, in order for the matching engine to execute the matching of one or more sink identifications to a source identification according to a matching topic; and computer usable program code configured to, following receipt of the data from a determined source at the switch, trigger the matching, by the matching engine, of one or more sink identifications to the determined source identification according to a matching topic.

8. The program product of claim 7, wherein the matching of the at least one source to the at least one sink is performed according to a matching topic.

9. The program product of claim 8, wherein a mapping table is used to store a result of the matching of the at least one source to the at least one sink.

10. A data processing system for matching messages and routing data, comprising:

means for receiving first messages, independent of the data, the first messages comprising source identification and receiving second messages, independent of the data, the second messages comprising sink identification that indicates a network address associated with the second messages;

means for matching one or more sink identifications to a source identification utilizing the first messages and the second messages; and means for receiving control signals dependent on a result of the matching and accordingly routing the data from a source to one or more sinks, wherein the first messages comprise publish messages comprising topic and source identification, and the second messages comprise subscribe messages comprising topic and sink identification, and the matching comprising matching one or more sink identifications to a source identification according to a matching topic, the data processing system further comprising a switch control;

means for receiving an output of the matching from a matching engine at the switch control and transmitting the control signals to the switch, the control signals defining the routing to be applied by the switch, wherein the publish messages and the subscribe messages are received at the switch control;

means for transmitting further messages to the matching engine from the switch control, in order for the matching engine to execute the matching of one or more sink identifications to a source identification according to a matching topic; and means for following receipt of the data from a determined source at the switch, triggering the matching, by the matching engine, of one or more sink identifications to the determined source identification according to a matching topic.

* * * * *